(12) United States Patent
Assmann

(10) Patent No.: US 6,865,671 B1
(45) Date of Patent: Mar. 8, 2005

(54) ELECTRONIC MAIL SYSTEM WITH AUTHENTICATION METHODOLOGY FOR SUPPORTING RELAYING IN A MESSAGE TRANSFER AGENT

(75) Inventor: Claus Assmann, Berkeley, CA (US)

(73) Assignee: Sendmail, Inc., Emeryville, CA (US)

( * ) Notice: Subject to any disclaimer, the term of this patent is extended or adjusted under 35 U.S.C. 154(b) by 0 days.

(21) Appl. No.: 09/562,523

(22) Filed: May 1, 2000

Related U.S. Application Data

(60) Provisional application No. 60/195,979, filed on Apr. 7, 2000.

(51) Int. Cl.[7] ................................................ H04L 9/00
(52) U.S. Cl. ...................... 713/154; 713/150; 713/155; 713/156; 713/157; 713/158; 713/200; 713/201; 709/200; 709/201; 709/203; 709/223; 709/225; 709/238; 709/240; 380/255; 380/277
(58) Field of Search .............................. 713/154, 156, 713/157, 200, 201, 158; 380/255, 277; 709/200, 201, 203, 223, 225, 238, 240

(56) References Cited

U.S. PATENT DOCUMENTS

| | | | |
|---|---|---|---|
| 5,604,803 A | | 2/1997 | Aziz |
| 5,764,639 A | | 6/1998 | Staples et al. |
| 5,774,552 A | * | 6/1998 | Grimmer ..................... 713/156 |
| 5,784,566 A | | 7/1998 | Viavant et al. |
| 5,845,070 A | | 12/1998 | Ikudome |
| 5,892,903 A | | 4/1999 | Klaus |

(List continued on next page.)

FOREIGN PATENT DOCUMENTS

| | | | | |
|---|---|---|---|---|
| EP | 1132796 A1 | * | 9/2001 | ............. G06F/1/00 |
| EP | 1233584 | * | 8/2002 | ........... H04L/12/58 |

OTHER PUBLICATIONS

Lakshminarayanan et al, FlexiCert: Merging X.509 Identity Certificates and Attribute Certificates, 2003, IEEE, pp. 489–493.*

Anonymous, PGP Corporation and Counterpane Internet Security Bring Standardized, Encrypted Communications to Customers Worldwide, 2004, Business Wire, pp. 1–3.*

Lin, Craig, A Multi–Agent System for Cooperative Document Indexing and Querying in Distributed Networked Environments, 1999, IEEE, pp. 400–405.*

Stowe, Gene, Computer frim installs layers of security, Dec. 2003, Tribune Business Weekly, p. 12.*

Dierks, T. et al., RFC2246: The TLS Protocol—Version 1.0, Internet Engineering Task Force, Jan. 1999.

Hoffman, P., RFC2487: SMTP Service Extension for Secure SMTP over TLS, Internet Engineering Task Force, Jan. 1999.

SENDMAIL, Sendmail for NT: User Guide, Sendmail (Part No.: DOC–SMN–300–WNT–MAN–0999), 1999.

(List continued on next page.)

Primary Examiner—Emmanuel L. Moise
Assistant Examiner—Aravind K Moorthy
(74) Attorney, Agent, or Firm—John A. Smart

(57) ABSTRACT

An electronic mail ("e-mail") system is described that provides a methodology that allows the system to determine when it is appropriate to relay e-mail messages, particularly from "roaming" users. In basic operation, the methodology of the present invention first checks whether the client has been authenticated. If not, the decision of whether relaying is allowed may be subject to other rules in the system, such as whether the user currently resides behind the company's firewall. Of interest herein is a case where the client has been authenticated. In that case, the system can allow relaying for everyone who has a certificate ("cert") signed by certain certificate authorities ("CAs"). Additionally, the system can require specific cert subjects.

15 Claims, 5 Drawing Sheets

U.S. PATENT DOCUMENTS

| | | | | |
|---|---|---|---|---|
| 5,961,590 | A | * 10/1999 | Mendez et al. | 709/206 |
| 5,968,177 | A | 10/1999 | Batten-Carew et al. | |
| 5,983,273 | A | 11/1999 | White et al. | |
| 6,052,785 | A | * 4/2000 | Lin et al. | 713/201 |
| 6,058,484 | A | * 5/2000 | Chapman et al. | 713/202 |
| 6,118,856 | A | * 9/2000 | Paarsmarkt et al. | 379/93.24 |
| 6,128,738 | A | * 10/2000 | Doyle et al. | 713/185 |
| 6,138,146 | A | * 10/2000 | Moon et al. | 709/206 |
| 6,185,605 | B1 | * 2/2001 | Kowaguchi | 709/206 |
| 6,185,689 | B1 | 2/2001 | Todd, Sr. et al. | |
| 6,189,027 | B1 | 2/2001 | Haneda et al. | |
| 6,192,410 | B1 | 2/2001 | Miller et al. | |
| 6,275,941 | B1 | * 8/2001 | Saito et al. | 713/201 |
| 6,285,991 | B1 | 9/2001 | Powar | |
| 6,301,658 | B1 | * 10/2001 | Koehler | 713/155 |
| 6,330,070 | B1 | 12/2001 | Toyoda et al. | |
| 6,417,930 | B2 | * 7/2002 | Mori | 358/1.15 |
| 6,427,164 | B1 | * 7/2002 | Reilly | 709/206 |
| 6,437,806 | B1 | * 8/2002 | Iwasa | 715/764 |
| 6,438,583 | B1 | * 8/2002 | McDowell et al. | 709/206 |
| 6,609,196 | B1 | * 8/2003 | Dickinson et al. | 713/154 |
| 6,687,822 | B1 | * 2/2004 | Jakobsson | 713/156 |
| 6,732,101 | B1 | * 5/2004 | Cook | 707/10 |
| 6,763,459 | B1 | * 7/2004 | Corella | 713/156 |

OTHER PUBLICATIONS

Crispin, M., RFC2061: IMAP4 Compatibility With IMAP2BIS, Internet Engineering Task Force, Doc. 1996.

Crispin, M., RFC2060: Internet Mesage Access Protocol—Version 4 (rev 1), Internet Engineering Task Force, Nov. 1996.

Myers, J., RFC2033: Local Mail Transfer Protocol, Internet Engineering Task Force, Oct. 1996.

Myers, J., RFC1725: Post Office Protocol—Version 3, Internet Engineering Task Force, Nov. 1994.

Braden, R. (Editor), RFC1123: Requirements for Internet Hosts—Application and Support, Internet Engineering Task Force, Oct. 1989.

Rose, M., RFC1081: Post Office Protocol—Version 3, Internet Engineering Task Force, Nov. 1988.

Partridge, Craig, RFC974: Mail Routing and the Domain System, Internet Engineering Task Force, Jan. 1986.

Butler, M. et al., RFC937: Post Office Protocol—Version 2, Internet Engineering Task Force, Feb. 1985.

Crocker, David H., RFC822: Standard For The Format Of Arpa Internet Text Messages, Dept. of Electrical Engineering, University of Delaware, Aug. 1982.

Postel, Jonathan B., RFC821: Simple Mail Transfer Protocol, Information Sciences Institute, University of Southern California, Aug. 1982.

* cited by examiner

ELECTRONIC MAIL SYSTEM WITH AUTHENTICATION METHODOLOGY FOR SUPPORTING RELAYING IN A MESSAGE TRANSFER AGENT

RELATED APPLICATIONS

The present application is related to commonly-owned U.S. provisional application Ser. No. 60/195,979, filed Apr. 7, 2000, titled AUTHENTICATION METHODOLOGY FOR SUPPORTING REMOTE CONNECTIONS TO A MESSAGE TRANSFER AGENT, the disclosure of which (including any attachments and appendices thereof) is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic mail (e-mail) systems and, more particularly, to improved methodology for supporting relaying of e-mail messages in a Message Transfer Agent, particularly by "roaming" users (i.e., users outside a company's firewall or administrative domain).

Today, electronic mail or "e-mail" is a pervasive, if not the most predominant, form of electronic communication. FIG. 1 illustrates the basic architecture of a typical electronic mail system 10. At a high level, the system includes a mail server connected over a network to various e-mail "clients," that is, the individual users of the system. More specifically, the system 10 includes one or more clients 11 connected over a network to at least one SMTP (Simple Mail Transport Protocol) server or "Message Transfer Agent" (MTA) 12a for routing e-mail. Users write, send, and read e-mail via Mail User Agents (MUA), such as Microsoft Outlook™ or mutt, present at each client (computer). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® Switch product line.)

1. Larry composes the message and chooses Send in Microsoft Outlook Express (a "Mail User Agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the local mail server running sendmail. The DNS server translates the domain name into an IP address, 10.1.1.1, of the local mail server.
3. Microsoft Outlook Express opens an SMTP connection to the local mail server running sendmail. The message is transmitted to the sendmail server using the SMTP protocol.
4. sendmail queries a DNS server for the MX record of the destination domain, i.e., example.org. The DNS server returns a hostname, e.g., mail.example.org. sendmail queries a DNS server for the A record of mail.example.org, i.e., the IP address. The DNS server returns an IP address 127.118.10.3.
5. sendmail opens an SMTP connection to the remote mail server providing e-mail service for example.org which is also running sendmail. The message is transmitted to the sendmail server using the SMTP protocol.
6. sendmail delivers Larry's message for Martha to the local delivery agent. It appends the message to Martha's mailbox. By default, the message is stored in: /var/spool/mail/martha.
7. Martha has her computer dial into her ISP.
8. Martha chooses Check Mail in Eudora.
9. Eudora opens a POP3 (Post Office Protocol version 3, defined in RFC1725) connection with the POP3 (incoming mail) server. Eudora downloads Martha's new messages, including the message from Larry.
10. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request For Comment documents (RFCs). Typically, the mail server or MTA must temporarily store incoming and outgoing messages in a queue, the "mail queue." Actual queue size is highly dependent on one's system resources and daily volumes.

MTAs, such as the commercially-available Sendmail® MTA, perform three key mail transport functions:
Routes mail across the Internet to a gateway of a different network or "domain" (since many domains can and do exist in a single network)
Relays mail to another MTA (e.g., 12b) on a different subnet within the same network
Transfers mail from one host or server to another on the same network subnet.

To perform these functions, it accepts messages from other MTAs or MUAs, parses addresses to identify recipients and domains, resolves aliases, fixes addressing problems, copies mail into a queue on its hard disk, tries to process long and hard-to-pass messages, and notifies the sender when a particular task cannot be successfully completed. The MTA does not store messages (apart from its queue) or help users access messages. It relies on other mail system components, such as message delivery agents, message stores and mail user agents (MUAs), to perform these tasks. These additional components can belong to any number of commercial or free products (e.g., POP3 or IMAP servers, Microsoft Exchange, IBM Lotus Notes, Netscape, cc:Mail servers, or the like). Because of its central role in the e-mail systems, however, the MTA often serves as the "glue" that makes everything appear to work together seamlessly.

The overall process may be summarized as follows. E-mail is routed via SMTP servers, the so-called "Mail Transfer Agents" (MTA). Users write, send, and read e-mail via Mail User Agents (MUA). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

For further description of e-mail systems, see e.g., *Sendmail® for NT User Guide*, Part Number DOC-SMN-300-WNT-MAN-0999, available from Sendmail, Inc. of Emeryville, Calif., the disclosure of which is hereby incorporated by reference. Further description of the basic architecture and operation of e-mail systems (including TLS, as described in further detail below) is available in the technical and trade literature; see e.g., the following RFC (Request For Comments) documents:

RFC821 Simple Mail Transfer Protocol (SMTP)
RFC822 Standard for the Format of ARPA Internet Text Messages
RFC974 Mail Routing and the Domain System
RFC1123 Requirements for Internet Hosts—Application and Support
RFC1725 Post Office Protocol version 3 (POP3)
RFC2033 Local Mail Transfer Protocol (IMP)
RFC2060 Internet Message Access Protocol (IMAP), Ver. 4, rev. 1
RFC2246 The TLS protocol, version 1.0
RFC2487 SMTP service extension for secure SMTP over TLS currently available via the Internet (e.g., at ftp://ftp.isi.edu/in-notes), the disclosures of which are hereby incorporated by reference. RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards.

In an e-mail system, the system must identify its users to ensure safe usage of the system. In a typical configuration, an MTA exists on a company's local area network and, from the location, sends mail to and receives mail from users, including of course users that are outside to the local area network. Some of those users, particularly "remote" employees, may be communicating with the MTA via the Internet. When an MTA receives from an external user (i.e., outside its current domain) mail which is intended to be forwarded to another location (i.e., again, outside the current domain), the MTA must decide whether it can in fact safely forward or relay that mail to the other location. This is particularly a problem for remote or "roaming" users—that is, users that want to use a particular MTA (e.g., because of certain properties)—who must send e-mail from an external source via the particular MTA to another external source. Typically, these are users who are connecting in a manner such that they cannot be identified or authenticated via an LP address or e-mail address.

As basic SMTP does not provide any authentication, it is common practice for MTAs to accept e-mail from any source and send it to any recipient. This open architecture has been abused by people who send unsolicited e-mail (UBE) to many recipients via third-party MTAs, thus stealing resources (e.g., bandwidth and storage).

A very simple approach to address this problem is to allow only trusted hosts (e.g., recognized via IP address or hostname) to use an MTA for relaying. However, this does not address the problem for "roaming" users—that is, users who may connect from different, untrusted, or unknown IP addresses. Therefore, more sophisticated approaches have been attempted.

Two methods in common use to allow relaying based on some form of authentication are "POP before Relay" and "SMTP AUTH". Each has its own set of distinct disadvantages, however. Regarding the first approach, POP is a message access protocol which requires authentication. The IP address belonging to the authenticated entity is stored in a database with a timestamp. This database is used by the MTA to allow (for a limited time) full access, including relaying. However, that approach has problems. For instance, users must use POP to read or at least access the POP server before sending e-mail. Further, the timeout can be too short or too long and hence either cut off a user and require her/him to re-authenticate via POP, or allow another (unauthenticated) user to accidently access the MTA. Regarding the second approach, SMTP AUTH is defined in RFC2554 which is based on SASL as described in RFC2222. The possible problems with this method include lack of support in MUAs as well as fairly insecure authentication mechanisms (e.g., using clear text passwords).

What is needed is an easy way for e-mail systems to determine when it is appropriate to relay e-mail messages, particularly from "roaming" users. At the same time, however, the system should safeguard against relaying attempts by unauthorized users. The present invention fulfills this and other needs.

SUMMARY OF THE INVENTION

An electronic mail ("e-mail") system is described that provides a methodology that allows the system to determine when it is appropriate to relay e-mail messages, particularly from "roaming" users. In basic operation, the methodology of the present invention first checks whether the client has been authenticated. If not, the decision of whether relaying is allowed may be subject to other rules in the system, such as whether the user currently resides behind the company's firewall. Of interest herein is a case where the client has been authenticated. In that case, the system can allow relaying for everyone who has a certificate ("cert") signed by certain certificate authorities ("CAs"). Additionally, the system can require specific cert subjects.

The detailed method steps of the system's authentication methodology for supporting relaying of e-mail from a roaming user are as follows. At the outset, the system checks whether the client has been authenticated. If "yes," the method will continue; otherwise, the method will stop. Now, the system may optionally rewrite the certificate issuer ("cert issuer") using a regular expression to extract only relevant parts (i.e., extract only a portion of the Distinguished Name). The system then looks up the (modified) cert issuer in its access map (lookup database), using a tag CERTISSUER:; if it does not exist, the method will stop. When the lookup succeeds, one of the following values (RHS) is obtained (as the lookup value):

RELAY: allow relaying
SUBJECT: continue

In the case of RELAY, the system allows relaying immediately—that is, the system will cease further processing of the ruleset and will return "relay cert issuer" to the calling ruleset.

In the case of SUBJECT, the system must examine the certificate of the client itself (i.e., the certificates subject or "cert subject"). The system may, again, optionally rewrite the cert subject using a regular expression to extract only relevant parts (i.e., extract a portion of the Distinguished Name). It is tagged with CERTSUBJECT: to distinguish it from the "cert issuer." Now, the system looks up the (modified) cert subject in the access map. If it does not exist in the access map, the method will stop. Otherwise, the system will proceed to check the value (RHS), as follows:

RELAY: allow relaying everything else: return nothing and stop.

In a manner similar to that previously shown for the cert issuer, for RELAY, the system immediately allows relaying. In all other instances (i.e., the "fall through" case), the method returns nothing, thereby indicating that relaying has not been allowed based on this ruleset. (It may be allowed elsewhere due to other rules.)

DETAILED DESCRIPTION OF A PREFERRED EMBODIMENT

The following description will focus on the presently-preferred embodiment of the present invention, which is implemented in a server-side application operating in an Internet-connected environment running under a network operating system, such as FreeBSD running on an IBM-compatible PC. The present invention, however, is not limited to any particular one application or any particular environment. Instead, those skilled in the art will find that the system and methods of the present invention may be advantageously embodied on a variety of different platforms, including OpenBSD, Linux, Solaris, AIX, OSF1, Microsoft Windows, and the like. Therefore, the description of the exemplary embodiments which follows is for purposes of illustration and not limitation.

Computer-based Implementation

A. Basic System Hardware (e.g., for Client and Server Computers)

Figure 1:
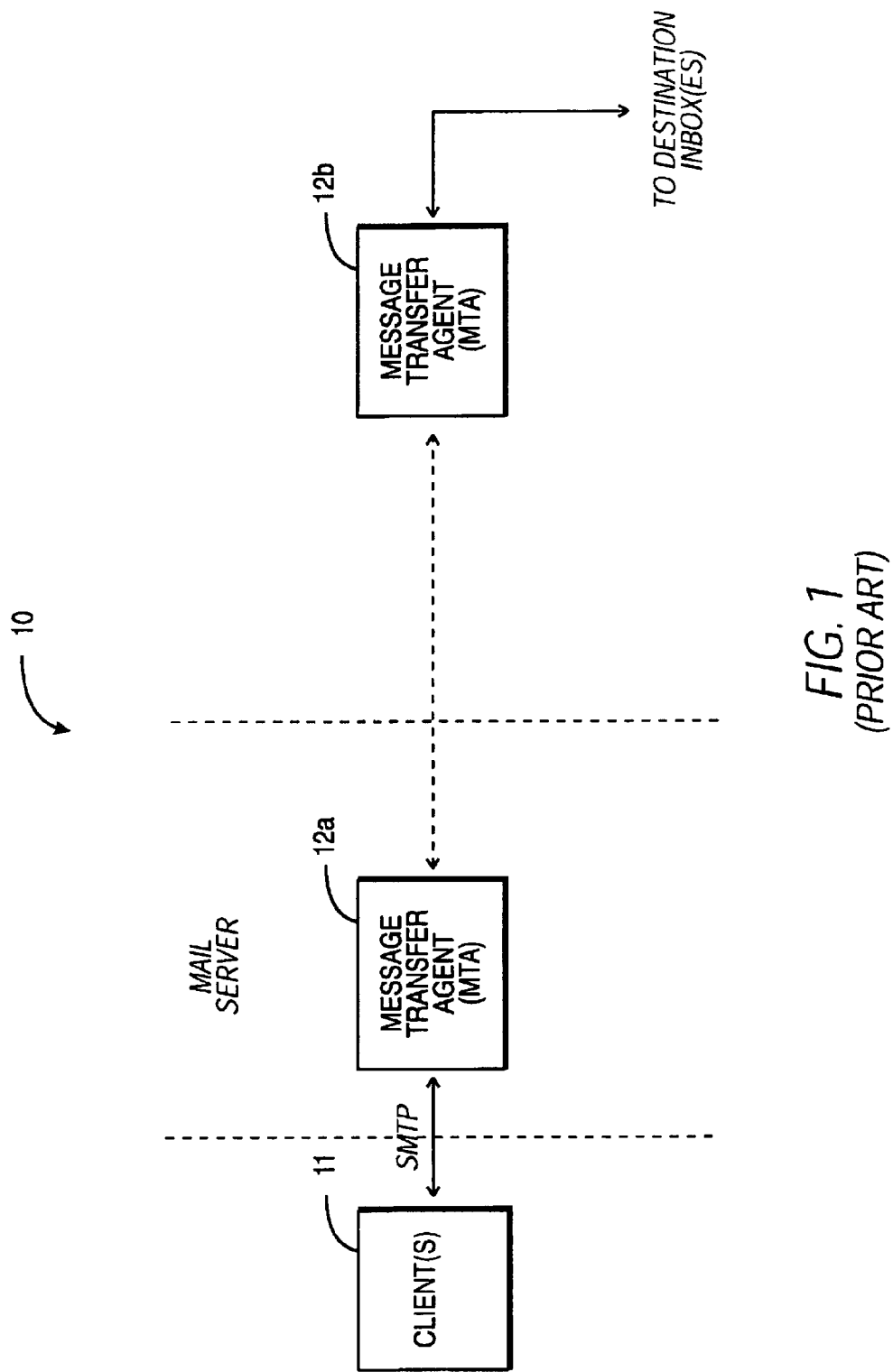
FIG. 1 is a block diagram illustrating the basic architecture of a typical electronic mail system.
Figure 2:
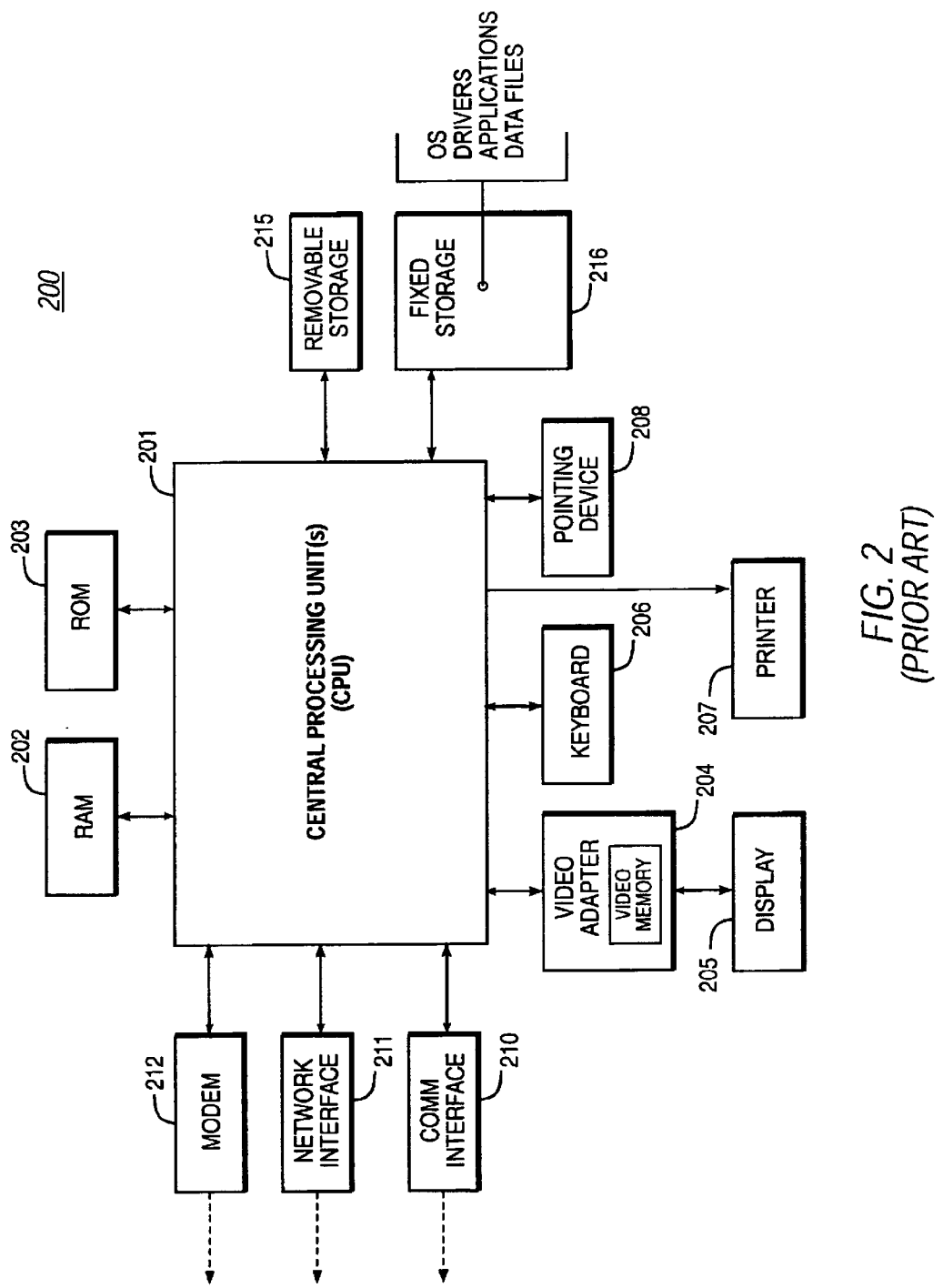
FIG. 2 is a block diagram illustrating a basic computer system suitable for implementing desktop (e.g., e-mail client) and server (e.g., mail server) components of the electronic mail system of the present invention.

The present invention may be implemented on a conventional or general-purpose computer system, such as an IBM-compatible personal computer (PC) or server computer. FIG. 2 is a very general block diagram of an IBM-compatible system 200. As shown, system 200 comprises a central processor unit(s) (CPU) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary input/output controller circuitry and other "glue" logic). The bus, which includes address lines for addressing system memory, provides data transfer between and among the various components. A description of Pentium-class microprocessors and their instruction set, bus architecture, and control lines is available from Intel Corporation of Santa Clara, Calif. Random-access memory (RAM) 202 serves as the working memory for the CPU 201. In a typical configuration, RAM of sixteen megabytes or more is employed. More or less memory may be used without departing from the scope of the present invention. The read-only memory (ROM) 203 contains the basic input/output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or fixed storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the display device 205. Likewise, the pointing device 208, such as a mouse, track ball, pen device, or the like, permits selection and manipulation of objects on the display screen. In this manner, these input devices support manual user input for any process running on the system.

The computer system displays text and/or graphic images and other data on the display device 205. Display device 205 is driven by the video adapter 204, which is interposed between the display device 205 and the system 200. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include a RS-232 serial port, a Universal Serial Bus (USB) interface, or the like. Devices that will be commonly connected locally to the comm interface 210 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun SPARC workstations, which are available from Sun Microsystems of Mountain View, Calif.

The above-described system 200 of FIG. 2 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having services and/or information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 3:
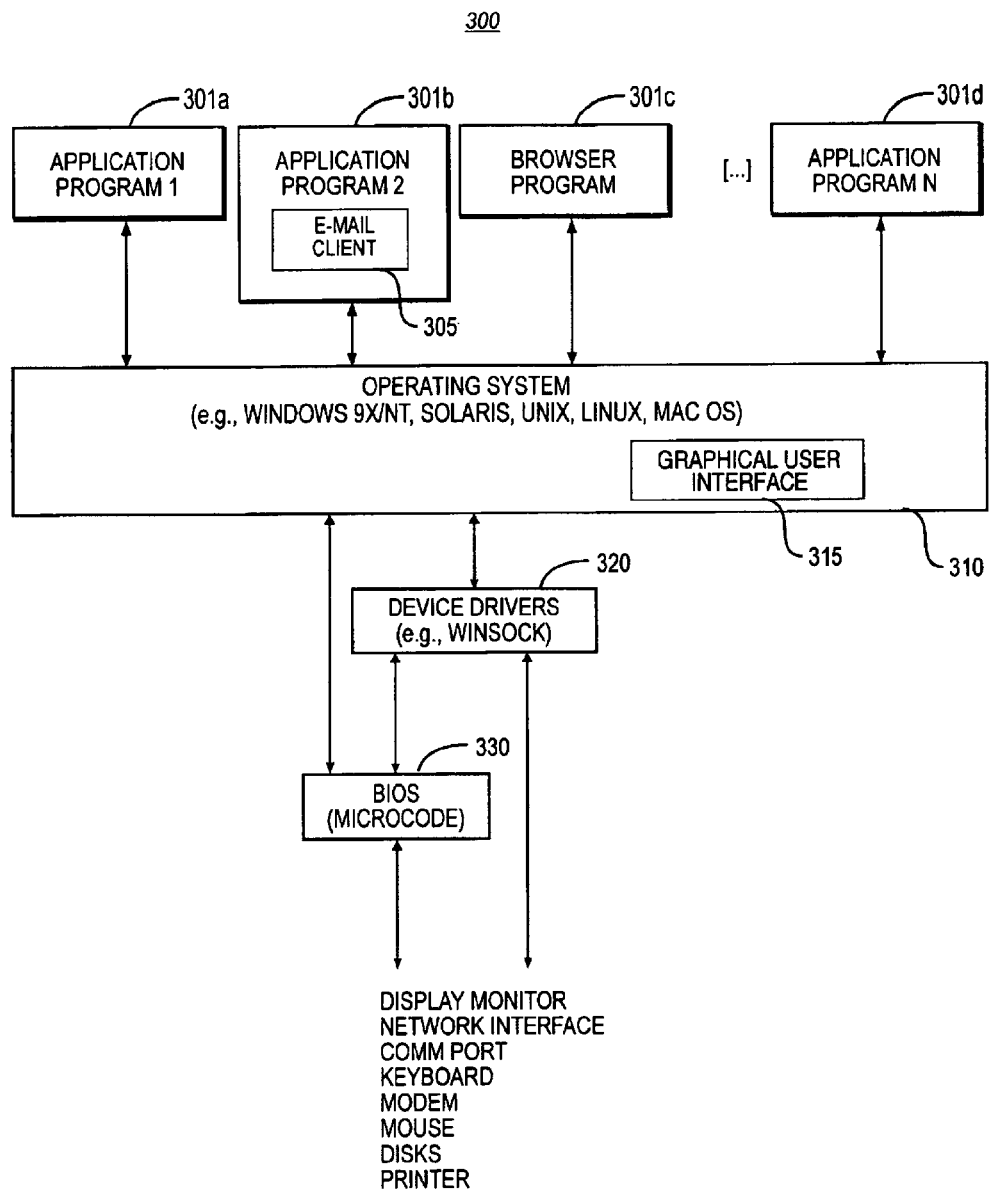
FIG. 3 is a block diagram of a basic software/firmware system suitable for controlling operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c, 301d) may be "loaded" (i.e., transferred from fixed storage 216 into memory 202) for execution by the software system 300. For instance, when the system 200 is employed to control a desktop machine, application software 301 includes client e-mail software 305 (e.g., Microsoft Outlook, available from Microsoft Corporation of Redmond, Wash.), as shown. When the system 200 is employed to control a server machine, on the other hand, application software 301 includes mail server software (e.g., Sendmail® for NT), including a Message Transfer Agent (MTA) of the present invention.

Software system 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 330 (i.e., ROM-based microcode), particularly when interfacing with peripheral devices. OS 310 can be provided by a conventional operating system, such as Solaris (available from Sun Microsystems of Mountain View, Calif.), OpenBSD (available for Internet download, e.g., from http://www.OpenBSD.org), or Linux OS (available from several vendors, including the Red Hat distribution of Linux from Red Hat, Inc. of Durham, N.C.).

Authentication Methodology for Supporting Remote Connections to an MTA

A. Including TLS Support within the Sendmail MTA

TLS (Transport Layer Security), which is influenced by X.509 certificates (public key cryptography), is a generic layer to provide authentication and encryption for many applications. In basic operation, the client and the server can authenticate each other through use of a certificate, a signed public key. STARTTLS is a standardized protocol defined in RFC2487, which is based on TLS as described in RFC2246. It allows for authentication of servers and clients in an SMTP session based on public key cryptography (currently X.509 certificates and several ciphers). For an introduction to X.509 certificates, see e.g., Tremblett, P., X.509 Certificates, Dr. Dobb's Journal, July 1999, pp. 42–51, the disclosure of which is hereby incorporated by reference.

STARTTLS has been implemented in the sendmail MTA for Sendmail Secure Switch 2.0. It is based on existing solutions, including OpenSSL (see e.g., *OpenSSL: The open source toolkit for ssl/tls,* 2000, currently available online at http://www.opensslorg/), example programs, and a patch for Postfix (see e.g., Lutz Jaenicke, Postfix, 2000, currently available at http://www.aet.tu-cottbus.de/personen/jaenicke/pfixtls/). X.509 certificates tie a Distinguished Name (DN) together with a public key and those data structures are digitally signed by a Certificate Authority (CA). According to the X.509 standard, a Distinguished Name consists of several named fields, such as Country (C), State (ST), Location (L), Organization (O), and a Common Name (CN). The DN of the CA is called the cert issuer, the DN of the cert itself is called the cert subject.

The sendmail binary (i.e., "sendmail") uses a configuration file (sendmail.cf) to define several options, routing of e-mail, rewriting of addresses, and rejection or acceptance of connections and relaying attempts. The interaction of sendmail with its configuration file is defined by options, macros, classes, rulesets, and mailer definitions. For example, the decision of whether an e-mail is relayed is based on a ruleset called check_rcpt. For further description of the sendmail configuration file, see the documentation accompanying sendmail, particularly *Sendmail manual, chapter 5: The Whole Scoop on the Configuration File* (available from Sendmail, Inc., of Emeryville, Calif. and included with the above-referenced, commonly-own provisional application Ser. No. 60/195,979), the disclosure of which is hereby incorporated by reference.

To communicate parameters of the SMTP dialogue to the configuration file, the sendmail binary sets macros whose values can be used in rulesets. Thus during run-time operation, one can determine whether something is available or set (e.g., state information) by accessing the corresponding macro value. The result of the TLS handshake protocol is reflected in several macros, the most important for the present invention is whether the client could be authenticated. In addition, cert issuer and cert subject are stored in variables beside other data. Based on whether a particular client is authenticated, the system may decide whether to allow or reject message relaying.

B. Internal Operation

1. General

In basic operation, the methodology of the present invention first checks whether the client has been authenticated. If not, the decision of whether relaying is allowed may be subject to other rules in the system, such as whether the user currently resides behind (i.e., is logged onto) the company's firewall. Of interest herein is a case where the client has been authenticated. In that case, the system can allow relaying for everyone who has a certificate ("cert") signed by certain certificate authorities ("CAs"). Additionally, the system can require specific cert subjects.

2. Detailed Operation a. Access Map and Macros

To communicate parameters of the SMTP dialogue to the configuration file, macros are set whose values can be used in rulesets. For many decisions, sendmail uses a so-called access map, which is a simple database that maps keys (Left Hand Side: LHS) to values (Right Hand Side: RHS). sendmail also has a special kind of map based on regular expressions. It can be used to perform pattern matches and to rewrite strings.

For STARTTLS, the sendmail binary uses the following macros (commands):

{cert_issuer}: holds the DN of the CA (the cert issuer).

{cert_subject}: holds the DN of the CERT (called the cert subject).

{tls_version}: the TLS/SSL version used for the connection: TLSv1, SSLv3, SSLv2.

{cipher}: the cipher used for the connection, such as:
EDH-DSS-DES-CBC3-SHA
EDH-RSA-DES-CBC-SHA
DES-CBC-MD5
DES-CBC3-SHA
RC2-CBC-MD5
RC4-MD5

{cipher_bits}: the key length (in bits) of the symmetric encryption algorithm used for the connection.

{verfy}: holds the result of the verification of the presented CERT. Possible values are:

| | |
|---|---|
| OK | verification succeeded |
| NO | no certificate presented |
| FAIL | certificate presented but could not be verified |
| NONE | STARTTLS has not been performed |
| TEMP | a temporary error occurred |
| PROTOCOL | a protocol error occurred |
| SOFTWARE | a TLS handshake error occurred |

{cert_issuer} and {cert_subject} are both translated into an internal form via a 1—1 mapping called xtextify. In addition to the non-printable ASCII characters, the characters '<', '>','(',')', ' ', and '+' are translated.

b. Ruleset Description

Rulesets define a simple rewrite engine; in contrast to regular expressions used in vi, perl, and the like, they act on tokens (sequence of characters belonging together) instead of single characters. Each rule consists of an LHS and an RHS: if the pattern on the LHS matches the input it is rewritten according to the RHS. Pattern matching is straightforward, where special symbols are introduced by the dollar sign.

The following two tables explain the metasymbols that can be used in rules.

| LHS: Metasymbol | matches |
|---|---|
| $* | zero or more tokens |
| $+ | one or more tokens |
| $- | one token |
| $@ | empty |
| $X | content of macro X |
| $ = C | phrase is member of class C |
| $~C | token is not a member of class C |

| RHS: Metasymbol | replaced with |
|---|---|
| $n | phrase which matched the n th pattern where n is a number from 1 to 9 |
| $X | content of macro X |
| $(map key $: def $) | map lookup | c. Source Code (Macro Script) Implementation

The following is part of the source code that may be used to generate the sendmail configuration file, e.g., the ruleset that checks whether relaying based on certificates should be allowed. It is processed by the m4 macro processor to generate the actual sendmail.cf file.

```
 1: SRelayAuth
 2: # authenticated?
 3: dnl we do not allow relaying for anyone who can present
    a cert
 4: dnl signed by a "trusted" CA. For example, even if we put
    verisigns
 5: dnl CA in CERTPath so we can authenticate users, we do
    not allow
 6: dnl them to abuse our server (they might be easier to get
    hold of,
 7: dnl but anyway).
 8: dnl so here is the trick: if the verification succeeded
 9: dnl we look up the cert issuer in the access map
10: dnl (maybe after extracting a part with a regular
    expression)
11: dnl if this returns RELAY we relay without further
    questions
12: dnl if it returns SUBJECT we perform a similar check on
    the
13: dnl cert subject.
14: R$* $| OK $: $1
15: R$* $| $* $@ NO not authenticated
16: ifdef('_ACCESS_TABLE_', 'dnl
17: ifdef('_CERT_REGEX_ISSUER_', 'dnl
18: R$* $: $1 $ | $(CERTIssuer $&{cert_issuer} $)',
19: 'R$* $: $1 $ == $&{cert_issuer}')
20: R$* $| $+ $: $1 $| $(access CERTISSUER:$2 $)
21: dnl use $# to stop further checks (delay_check)
22: R$* $| RELAY $# RELAYCERTISSUER
23: ifdef('_CERT_REGEX_SUBJECT_', 'dnl
24: R$* $| SUBJECT $: $1 $| <@> $(CERTSubject
    $&{cert_subject} $)',
25: 'R$* $| SUBJECT $: $1 $| <@> $&(cert_subject)')
26: R$* $| <@> $+ $: $1 $| <@> $(access
    CERTSUBJECT:$&{cert_subject}
27: R$* $| <@> RELAY $# RELAYCERTSUBJECT
28: R$* $| $* $: $1', 'dnl').
```

(Line numbers have been added to clarify the following description.)

Figure 4A:
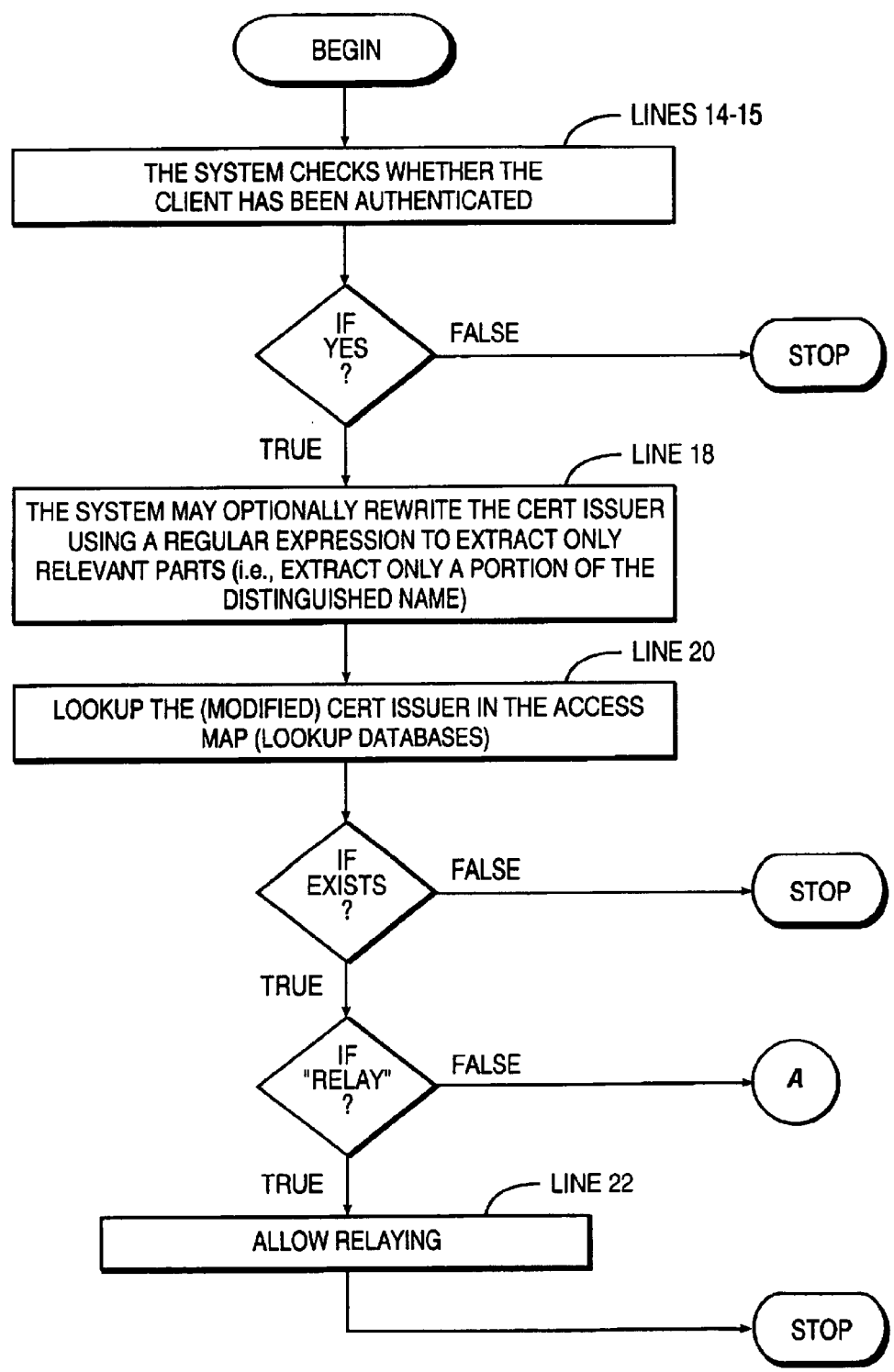
FIGS. 4A–B comprise a flowchart illustrating authentication methodology for supporting remote connections to a message transfer agent, particularly for the purpose of allowing relaying of e-mail.
Figure 4B:
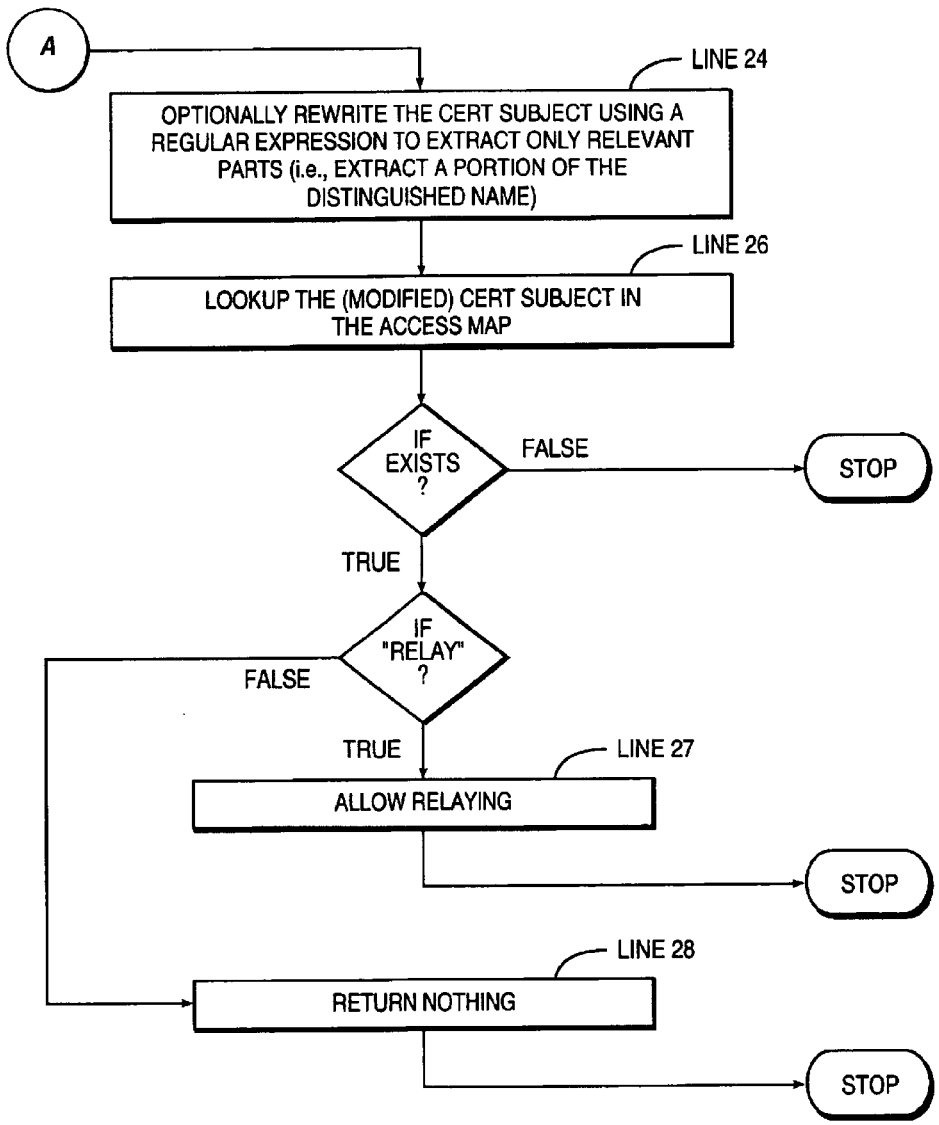

As illustrated by the above source code and also shown and accompanying FIGS. 4A–B, the system's authentication methodology for supporting relaying of e-mail from a roaming user is as follows. At the outset, at the lines 14–15, the system checks whether the client has been authenticated. If "yes," the method will continue; otherwise, the method will stop. Now, the system may optionally rewrite the cert issuer using a regular expression to extract only relevant parts (i.e., extract only a portion of the Distinguished Name), as indicated at line 18. At line 20, the system looks up the (modified) cert issuer in the access map (lookup database), using a tag CERTISSUER:; if it does not exist, the method will stop. When the lookup succeeds, one of the following values (RHS) is obtained (as the lookup value):

RELAY: allow relaying—indicated at line 22

SUBJECT: continue—proceed to lines 23 and beyond

In the case of RELAY, the system allows relaying immediately—that is, the system will cease further processing of the ruleset and will return "relay cert issuer" to the calling ruleset.

In the case of SUBJECT, the system must examine the certificate of the client itself (i.e., the "cert subject"). The system may, again, optionally rewrite the cert subject using a regular expression to extract only relevant parts (i.e., extract a portion of the Distinguished Name), at line 24. It is tagged with CERTSUBJECT: to distinguish it from the "cert issuer." Now, the system looks up the (modified) cert subject in the access map, at line 26. If it does not exist in the access map, the method will stop. Otherwise, the system will proceed to check the value (RHS), as follows:

RELAY: allow relaying—indicated at line 27 everything else: return nothing and stop—indicated at line 28.

In a manner similar to that previously shown for the cert issuer, for RELAY, the system immediately allows relaying. In all other instances (i.e., the "fall through" case), the method returns nothing, thereby indicating that relaying has not been allowed based on this ruleset. (It may be allowed elsewhere due to other rules.)

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In an electronic mail (e-mail) system, a method for determining whether to approve relaying of e-mail received from a roaming user, the method comprising:

attempting to authenticate the user for purposes of relaying an e-mail, through use of a certificate;

if the user cannot be authenticated, immediately terminating the method without approval of relaying;

determining a certificate issuer for the now-authenticated user;

if the certificate issuer is unknown to the system, immediately terminating the method without approval of relaying;

determining whether relaying is allowed based on identity of the certificate issuer;

if relaying is allowed based on identity of the certificate issuer, immediately terminating the method with approval of relaying;

determining whether relaying is allowed based on identity of the user as a certificate subject; and if relaying is allowed based on identity of the certificate subject, terminating the method with approval of relaying, otherwise terminating the method without approval of relaying.

2. The method of claim 1, wherein said certificate comprises a signed public key.

3. The method of claim 1, wherein said certificate comprises an X.509 certificate.

4. The method of claim 1, wherein said certificate issuer is associated with a Distinguished Name and wherein said step of determining a certificate issuer includes:

optionally rewriting information from the certificate using a regular expression to extract only a portion of the Distinguished Name associated with the certificate issuer.

5. The method of claim 1, wherein approval of relaying by the system may occur as a result of another method that also operates within the system.

6. The method of claim 1, wherein said certificate subject is associated with a Distinguished Name and wherein said step of determining whether relaying is allowed based on identity of the user as a certificate subject includes:

optionally rewriting information from the certificate using a regular expression to extract only a portion of the Distinguished Name associated with the certificate subject.

7. The method of claim 1, wherein said e-mail is received from said user while the user is currently logged onto a system that is remote from said e-mail system.

8. The method claim 1, wherein said e-mail system is protected by a firewall, and wherein said system that is remote resides outside said firewall.

9. The method of claim 1, wherein said step of determining whether relaying is allowed based on identity of the certificate issuer includes:

looking up the certificate issuer in a database, for determining whether relaying is allowed based on identity of that particular certificate issuer.

10. The method of claim 1, wherein said user connects to the e-mail system using a Mail User Agent.

11. The method of claim 10, wherein the Mail User Agent communicates with the e-mail system via SMTP.

12. The method of claim 1, wherein said step of attempting to authenticate the user is based, at least in part, on Transport Layer Security (TLS) protocol.

13. The method of claim 1, wherein said step of determining whether relaying is allowed based on identity of the certificate issuer includes:

looking up the certificate issuer in a database; and if a lookup value of RELAY is returned for the certificate issuer, specifying that relaying is allowed based on identity of this particular certificate issuer.

14. The method of claim 1, wherein said step of determining whether relaying is allowed based on identity of the certificate issuer includes:

looking up the certificate issuer in a database; and if a lookup value of SUBJECT is returned for the certificate issuer, specifying that determination of whether relaying is allowed will have to be determined based on identity of the user as a certificate subject.

15. The method of claim 1, wherein said system includes a Sendmail-compatible Message Transfer Agent (MTA) and wherein said method is controlled, at least in part, by a configuration file for the MTA.

* * * * *